US008966501B2

(12) United States Patent
Roll (10) Patent No.: US 8,966,501 B2
(45) Date of Patent: Feb. 24, 2015

(54) METHOD AND SYSTEM FOR TIME-BASED CORRELATION OF EVENTS

(75) Inventor: Stuart L. Roll, Sterling, VA (US)

(73) Assignee: CA, Inc., Islandia, NY (US)

( * ) Notice: Subject to any disclaimer, the term of this patent is extended or adjusted under 35 U.S.C. 154(b) by 371 days.

(21) Appl. No.: 13/305,488

(22) Filed: Nov. 28, 2011

(65) Prior Publication Data

US 2013/0139179 A1     May 30, 2013

(51) Int. Cl.
*G06F 13/00*     (2006.01)
*G06F 17/00*     (2006.01)

(52) U.S. Cl.
USPC .............................. 719/318; 707/694; 706/47

(58) Field of Classification Search
None
See application file for complete search history.

(56) References Cited

U.S. PATENT DOCUMENTS

| | | | |
|---|---|---|---|
| 6,366,926 B1 * | 4/2002 | Pohlmann et al. ..................... | 1/1 |
| 6,792,456 B1 * | 9/2004 | Hellerstein et al. ........... | 709/224 |
| 6,928,556 B2 * | 8/2005 | Black et al. ....................... | 726/6 |
| 7,020,645 B2 * | 3/2006 | Bisbee et al. .......................... | 1/1 |
| 7,219,239 B1 * | 5/2007 | Njemanze et al. ................ | 726/3 |
| 7,337,090 B1 * | 2/2008 | Yemini et al. ................. | 702/183 |
| 7,376,969 B1 * | 5/2008 | Njemanze et al. .............. | 726/22 |
| 8,176,527 B1 * | 5/2012 | Njemanze et al. ................ | 726/2 |
| 2004/0199622 A1 * | 10/2004 | Huscher et al. ............... | 709/223 |
| 2008/0126478 A1 * | 5/2008 | Ferguson et al. ............. | 709/203 |

* cited by examiner

*Primary Examiner* — H S Sough
*Assistant Examiner* — Phuong Hoang
(74) *Attorney, Agent, or Firm* — Baker Botts, L.L.P.

(57) ABSTRACT

A method includes receiving event information corresponding to an event associated with the operation of a system. The method also includes identifying related event information corresponding to a plurality of events that occurred before the event, wherein the event is related to the plurality of events. The method also includes storing the event information and the related event information as a group of events. The method further includes determining whether the group of events occurred within a first specified amount of time by identifying a time window ending at the occurrence of the event and beginning the first specified amount of time before the occurrence of the event and determining whether each event of the group of events occurred during the identified time window. The method further includes identifying an incident associated with the group of events upon determining that the group of events occurred within the first specified amount of time.

27 Claims, 5 Drawing Sheets

METHOD AND SYSTEM FOR TIME-BASED CORRELATION OF EVENTS

TECHNICAL FIELD

The present invention relates generally to event processing, and, more particularly, to a method and system for time-based correlation of events.

BACKGROUND

Monitoring the operation of a system, such as a computer system, manufacturing system, and/or any other type of system, may be essential to ensure that the system is operating in its intended manner and for its intended purpose. A system may be monitored to identify significant events and/or incidents associated with the operation of the system, which may allow the system to respond appropriately to the identified events and/or incidents. It may often be desirable to identify groups or sequences of significant events and/or incidents that occur within certain time constraints. Identifying events and/or incidents in this manner may involve the use of timers to determine whether the events and/or incidents occurred within the requisite time constraints. The use of timers, however, often results in decreases in performance due to the resources required to implement the timers.

SUMMARY

In accordance with a particular embodiment, a method may include receiving event information corresponding to an event associated with the operation of a system. The method may also include identifying related event information corresponding to a plurality of events that occurred before the event, wherein the event is related to the plurality of events. The method may also include storing the event information and the related event information as a group of events. The method may further include determining whether the group of events occurred within a first specified amount of time by identifying a time window ending at the occurrence of the event and beginning the first specified amount of time before the occurrence of the event and determining whether each event of the group of events occurred during the identified time window. The method may further include identifying an incident associated with the group of events upon determining that the group of events occurred within the first specified amount of time. In particular embodiments, the method may also include deleting, from the group of events, each event of the group of events that did not occur during the identified time window. In particular embodiments, the method may further include receiving additional event information corresponding to one or more additional events associated with the operation of the system and determining that the one or more additional events are associated with the identified incident.

In particular embodiments, a system may include an interface operable to receive event information corresponding to an event. The system may also include a processor coupled to the interface and operable to identify related event information corresponding to a plurality of events that occurred before the event, wherein the event is related to the plurality of events. The system may also include a memory coupled to the processor and operable to store the event information and the related event information as a group of events. The processor may also be operable to determine whether the group of events occurred within a first specified amount of time by identifying a time window ending at the occurrence of the event and beginning the first specified amount of time before the occurrence of the event and determining whether each event of the group of events occurred during the identified time window. The processor may further be operable to identify an incident associated with the group of events upon determining that the group of events occurred within the first specified amount of time.

In particular embodiments, a computer readable media may be embodied with logic that, when executed by a processor, may be operable to receive event information corresponding to an event associated with the operation of a system. The logic may also be operable to identify related event information corresponding to a plurality of events that occurred before the event, wherein the event is related to the plurality of events. The logic may also be operable to store the event information and the related event information as a group of events. The logic may further be operable to determine whether the group of events occurred within a first specified amount of time by identifying a time window ending at the occurrence of the event and beginning the first specified amount of time before the occurrence of the event and determining whether each event of the group of events occurred during the identified time window. The logic may further be operable to identify an incident associated with the group of events upon determining that the group of events occurred within the first specified amount of time.

Technical advantages of particular embodiments include a method and system for time-based correlation of events. Particular embodiments may provide time-based correlation of events without the need for a timer. Correlating events in this manner may be fast and resource efficient, which may result in increases in performance and less complexity in the implementation. Particular embodiments may also provide the ability to efficiently identify incidents associated with correlated events.

Other technical advantages will be readily apparent to those skilled in the art based on the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION OF THE INVENTION

Figure 1:
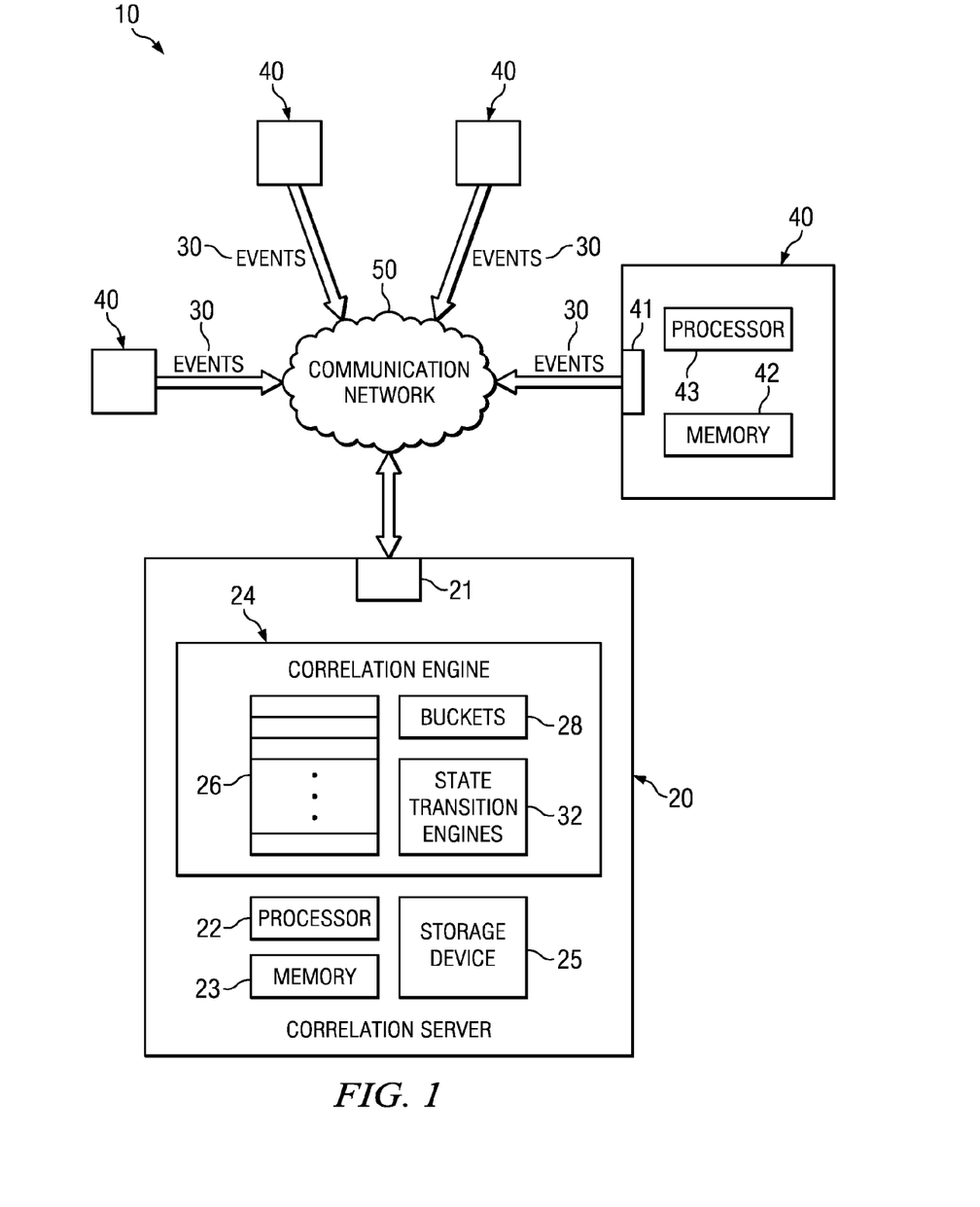
FIG. 1 illustrates a system for time-based correlation of events, in accordance with a particular embodiment.

FIG. 1 illustrates a system 10 for time-based correlation of events 30, including a correlation server 20, communication resources 40, and communications network 50. In particular embodiments, correlation server 20 may receive events 30 from communication resources 40 and may perform time-based correlation of the events 30 to identify incidents associated with the events 30.

Correlation server 20 may receive events 30 from communication resources 40 and may correlate events 30 to identify and/or respond to any incidents associated with the events 30. Correlation server 20 may comprise any suitable combination of hardware, software, and/or encoded logic for performing the functionality described herein. In the illustrated embodiment, correlation server 20 includes correlation engine 24, interface 21, processor 22, memory 23, and storage device 25. Interface 21 may include any suitable hardware, software or encoded logic for transmitting and/or receiving communication signals to and from one or more communications networks, such as communications network 50. In particular embodiments, interface 21 may facilitate communications between correlation server 20 and communication resources 40. Processor 22 may be a microprocessor, controller, or any other suitable computing device, resource, or combination of hardware, software and/or encoded logic operable to perform functionality associated with correlation server 20. Memory 23 may be any form of volatile or non-volatile memory suitable for storing information associated with the functionality described herein, including, without limitation, magnetic media, optical media, random access memory (RAM), read-only memory (ROM), removable media, and/or any combination thereof or any other suitable local or remote memory component. Storage device 25 may include any suitable resource for storing data or other information, including, without limitation, a direct access storage device (e.g., a hard disk drive or floppy disk), sequential access storage device (e.g., a tape disk drive), compact disk, CD-ROM, DVD, random access memory (RAM), and/or flash memory (e.g., a flash based solid-state drive).

Correlation engine 24 may be any suitable combination of hardware, software, and/or encoded logic for performing time-based event correlation functionality of correlation server 20 described herein. In particular embodiments, correlation engine 24 may utilize interface 21, processor 22, and/or memory 23 of correlation server 20 to provide the functionality described herein.

Communication resources 40 may be any resources capable of processing, generating, and/or identifying events 30 associated with the operation of system 10. Communication resources 40 may also be capable of transmitting information about events 30 to correlation server 20 to allow correlation server 20 to identify any incidents associated with the events 30. As an example, communication resources 40 may include an authentication server for authenticating a user prior to providing access to system 10. Events 30 associated with the authentication server may include successful and/or unsuccessful authentication attempts. As another example, communication resources 40 may include resources associated with a computer-integrated manufacturing (CIM) system. Events 30 associated with a CIM system may include completion of a particular product and/or manufacturing stage, errors or malfunctions in the manufacturing process, and/or any other event associated with the manufacturing process. In particular embodiments, communication resources 40 may be implemented remotely from correlation server 20, such as over a communications network 50. Communication resources 40 may also be implemented locally to correlation server 20, such as on the same server or computer terminal. Communication resources 40 may comprise any suitable combination of hardware, software, and/or encoded logic for performing the functionality described herein. In the illustrated embodiment, communication resources 40 include interface 41, processor 42, and memory 43. Interface 41 may include any suitable hardware, software or encoded logic for transmitting and/or receiving communication signals to and from one or more communications networks, such as communications network 50. In particular embodiments, interface 41 may facilitate communications between communication resources 40 and correlation server 20. Processor 42 may be a microprocessor, controller, or any other suitable computing device, resource, or combination of hardware, software and/or encoded logic operable to perform functionality associated with and communication resources 40. Memory 43 may be any form of volatile or non-volatile memory suitable for storing information associated with the functionality described herein, including, without limitation, magnetic media, optical media, random access memory (RAM), read-only memory (ROM), removable media, and/or any combination thereof or any other suitable local or remote memory component.

Communications network 50 may be used to facilitate communications among correlation server 20 and communication resources 40. Communications network 50 may be any interconnection of components capable of transmitting communication signals, data, and/or messages, such as a local area network (LAN), wide area network (WAN), global distributed network (e.g., the Internet), Intranet, Extranet, or any other form of wireless or wireline communication network.

In particular embodiments, communication resources 40 may generate events 30 associated with the operation of system 10. For example, communication resources 40 may facilitate the provision of one or more services and may generate events 30 associated with the services. Each event 30 may comprise certain information, including the type of event, the time the event occurred, information associated with the context of the event, and/or any other information associated with the event. Communication resources 40 may transmit identified events 30 to correlation server 20 to allow correlation server 20 to identify any incidents associated with the events 30. Depending on the particular embodiment, communication resources 40 may transmit events 30 to correlation server 20 immediately upon the occurrence of the event 30 and/or periodically, such as based on a time interval or an accumulation of a particular number of events 30. Correlation server 20 may receive events 30 and may use correlation engine 24 to correlate events 30 and identify incidents associated with events 30. After using correlation engine 24 to identify an incident associated with one or more events 30, correlation server 20 may take any appropriate action in response to the identified incident. In particular embodiments, correlation server 20 may respond to the incident itself and/or may notify the relevant communication resources 40 associated with the incident to allow the communication resources 40 to respond to the incident. As an example, in response to the identification of a security related incident such as an unauthorized attempt to login to an authentication server, correlation server 20 may log the unauthorized login attempt for subsequent review by administrative personnel. Correlation server 20 may also notify the communication resource 40 providing the authorization server of the incident, allowing the communication resource 40 to block subsequent login attempts from the user associated with the unauthorized attempt.

In particular embodiments, correlation engine 24 may receive events 30 from correlation server 20 and may use one or more rule engines 26 to correlate events 30 and identify incidents associated with events 30. An incident may be identified as the occurrence of a particular event 30 or sequence of events 30 that match certain criteria. In particular embodiments, a rule of a rule engine 26 may specify the particular event 30 or sequence of events 30 associated with an incident. When correlation engine 24 receives an event from correlation server 20, correlation engine 24 may provide the event 30 to each rule engine 26 to allow each rule engine 26 to process the event 30. When a rule engine 26 receives an event 30 from correlation engine 24, the rule engine 26 may filter the event 30 by ignoring the event 30 if it is not relevant to the rule associated with the rule engine 26. For example, because a particular rule may define an incident based on the occurrence of events 30 that meet certain criteria, such as particular types of events 30 (e.g., failed login attempts), events 30 that do not meet that criteria may not be relevant to that particular rule. If the rule engine 26 determines that the event 30 is relevant to the rule, the rule engine 26 may evaluate the rule to determine whether the rule has been triggered. In particular embodiments, a rule engine 26 may determine that a rule has been triggered upon detecting the occurrence of the particular event 30 and/or sequence of events 30 specified by the rule. Additionally, in particular embodiments, a rule may be evaluated separately for different groups of events 30. In such embodiments, the rule engine 26 may group a received event 30 with previously received events 30 based on a specified grouping criteria, and the rule engine 26 may then evaluate the rule on the particular group of events 30. For example, if a rule is triggered by five failed login attempts from the same user within ten minutes, a received event 30 may be grouped based on the user associated with the failed login attempt, and the rule may be evaluated on the group of events 30. In this manner, the rule may be evaluated separately for failed login attempts from different users. Upon determining that a rule has been triggered, the rule engine 26 may establish that an incident corresponding to the triggered rule has occurred and the rule engine 26 may notify correlation engine 24 of the incident. Correlation engine 24 may then notify correlation server 20 to allow correlation server 20 to respond appropriately to the identified incident.

In particular embodiments, events 30 received from communication resources 40 may be stored to allow the events 30 to be subsequently processed at a later time. For example, stored events 30 may be subsequently processed in response to a request from a system administrator. In such embodiments, correlation server 20 and/or correlation engine 24 may store received events 30 using any suitable storage mechanism, such as memory 23 and/or storage device 25. Correlation server 20 and/or correlation engine 24 may subsequently retrieve the stored events 30 and may process the events 30 in the manner described above to identify incidents associated with the events 30.

In particular embodiments, a rule may include a time-based component. For example, a rule may define an incident as a sequence of events 30 occurring within a particular amount of time. A time-based rule for an authentication server, for example, may define an incident as five failed login attempts by a user within ten minutes. In particular embodiments, time-based rules may be implemented using buckets 28. A bucket 28 may be a mechanism for storing events 30 processed by a rule engine 26 and may be implemented using any suitable storage mechanism, such as memory 23 or storage device 25. When a rule engine 26 receives an event 30 and determines that the event 30 should not be filtered, the rule engine 26 may store the event 30 in a bucket 28. In particular embodiments, the rule engine 26 may not necessarily receive events 30 in the order they occur, and thus the rule engine 26 may store each received event 30 in the bucket 28 in the appropriate order based on when the event 30 occurred. If the rule requires events 30 to be grouped, the rule engine 26 may use separate buckets 28 for each group and may store the received event 30 in the appropriate bucket 28.

The rule engine 26 may then evaluate the time-based rule to determine whether the rule has been triggered by the events 30 in the bucket 28. Evaluating the time-based rule may first involve determining whether the bucket 28 is full. The bucket 28 may be full if it contains the requisite number of events 30 to trigger the particular time-based rule. For example, if a time-based rule requires five failed login attempts, the rule engine 26 may determine that the bucket 28 is full if the bucket 28 contains at least five events 30. If the rule engine 26 determines that the bucket 28 is full, the rule engine 26 may then determine whether there are any old events 30 in the bucket 28, and if so, the rule engine 26 may delete the old events 30. Events 30 may be old if they do not satisfy the time constraints specified by the rule. For example, the time-based rule may require that the events 30 occur within a specified amount of time. In particular embodiments, the rule engine 26 may determine whether the events 30 occurred within the specified amount of time by identifying a time window ending with the time the most recent event 30 occurred and extending backwards for the specified amount of time. Rule engine 26 may then determine whether each event 30 in the bucket 28 occurred during the identified time window. In particular embodiments, determining whether the events 30 occurred within the identified time window may involve comparing the time of occurrence of each event 30 with the identified time window. If the rule engine 26 determines that an event 30 occurred outside the identified time window, the rule engine 26 may determine that the event 30 is old, and may delete the event 30 from the bucket 28.

In particular embodiments, a rule engine 26 may implement a reset filter which, upon detecting events 30 that meet certain criteria, may reset the evaluation of the particular rule as if no previous events 30 matching the filter of the rule had been received. For example, a rule may define an incident as five consecutive failed login attempts by a user without any intervening successful login attempts. In this example, a reset filter may be implemented to identify successful login attempts and reset the evaluation of the rule upon detecting a successful login attempt. Upon receiving events 30 representing failed login attempts, the rule engine 26 may determine that the events 30 match the filter of the rule and may store the events 30 in the appropriate bucket 28, as described above. Upon receiving an event 30 representing a successful login attempt, the rule engine 26 may first determine that the successful login attempt does not match the filter of the rule since the event 30 is not a failed login attempt. The rule engine 26 may then determine that the event 30 matches the reset filter of the rule since the event 30 is a successful login attempt. The rule engine 26 may then delete any previously received events 30 from the appropriate bucket 28. In this manner, upon receiving the next failed login attempt, the particular rule may be evaluated as if no previous failed login attempts had been received by the rule engine 26.

In particular embodiments, in order to minimize the storage space used by buckets 28, a rule engine 26 may delete old events 30 from its buckets 28 each time the rule engine 26 receives an event, regardless of whether the event 30 matches the filter of the rule engine 26 or whether any of the buckets 28 of the rule engine 26 are full. In this manner, old events 30 will be deleted from the buckets 28 whenever an event is received, preventing buckets 28 from wasting storage space by storing unnecessary events 30.

After the rule engine 26 has identified and deleted any old events 30, a bucket 28 may only contain events 30 that occurred within the identified time window. If the bucket 28 is no longer full, the rule engine 26 may determine that the time-based rule has not been triggered since the requisite number of events 30 did not occur within the specified amount of time. However, if the bucket 28 is still full, the rule engine 26 may determine that the time-based rule has been triggered since the requisite number of events 30 all occurred within the specified amount of time required by the time-based rule. If the time-based rule has been triggered, the rule engine 26 may conclude that an incident has occurred and may notify correlation engine 24 of the identified incident. Correlation engine 24 may then notify correlation server 20 to allow correlation server 20 to take the appropriate action in response to the identified incident. In this manner, time-based constraints on rules may be implemented without using a timer.

After a rule has been triggered and a corresponding incident has been identified, in particular embodiments tracking functionality may be used to identify subsequent events 30 that are related to the incident associated with the triggered rule. In such embodiments, a rule engine 26 may initiate a tracking session after a rule is triggered and the tracking session may continue until the tracking session expires. In particular embodiments, each rule may specify whether tracking is desired and may also specify the expiration of the tracking session. During a tracking session, a rule engine 26 may identify subsequent events 30 that match the filter and/or grouping of the rule that has been triggered. In particular embodiments, tracking may be implemented using buckets 28 and the rule engine 26 may add the subsequent events 30 to a tracking bucket 28 until the tracking session expires. A tracking session may expire based on a tracking limit and/or a tracking gap. A tracking limit may specify the maximum duration of a tracking session, and a tracking gap may specify the maximum amount of time that may lapse between events 30 during a tracking session. If the duration of a tracking session exceeds the tracking limit, or if the amount of time that lapses between events 30 exceeds the tracking gap, the tracking session may expire. After a tracking session expires, the rule engine 26 may include the events 30 that occurred during the tracking session with the previously identified incident and may flush the events 30 from the tracking bucket 28. In this manner, incidents may be identified more efficiently by associating related events 30 with an identified incident instead of processing the related events 30 as a separate incident. Events 30 that occur after a tracking session has expired may not be included with the identified incident and may instead be processed normally by the rule engine 26 to identify subsequent incidents.

In particular embodiments, a tracking bucket 28 may become full when the number of events 30 in the tracking bucket 28 reaches a specified maximum number. In such embodiments, when a tracking bucket 28 becomes full, the respective rule engine 26 may flush the events 30 from the tracking bucket 28 and may include the flushed events 30 with the previously identified incident. In this manner, the tracking bucket 28 may be periodically flushed before the tracking session expires to minimize the storage space used by the tracking bucket 28. In addition, in some embodiments, a single tracking bucket 28 may be used to store tracking events 30 from multiple different tracking sessions. When the tracking bucket 28 becomes full, the events 30 may be flushed and may each be included with their respective incidents.

In particular embodiments, rule engines 26 may use rules comprised of multiple sub-rules. For example, a rule may be comprised of sub-rules A, B, and C, such that sub-rule A is evaluated first; if sub-rule A is triggered then sub-rule B is evaluated; if sub-rule B is triggered then sub-rule C is evaluated; and if sub-rule C is triggered then an incident is identified. In particular embodiments, sub-rules may include time-based components such as the time-based components discussed above. Sub-rules may also include time constraints requiring the sub-rules to trigger within a specified amount of time after the previous sub-rule is triggered. Because these time constraints are tied to the previous sub-rule, only sub-rules evaluated after the first sub-rule may have such time constraints. For example, a rule comprised of sub-rules A, B, and C may require that sub-rule B trigger within a specified amount of time after sub-rule A and that sub-rule C trigger within a specified amount of time after sub-rule B. If a particular sub-rule does not trigger within the specified amount of time, the rule engine 26 may restart by evaluating the first sub-rule. If all sub-rules trigger within the specified amount of time, the rule engine 26 may generate an incident based on all events 30 that caused the sub-rules to trigger.

In particular embodiments, state transition engines 32 may be used to evaluate rules comprised of multiple sub-rules. In such embodiments, a state transition engine 32 may implement a state tree, with each state corresponding to a different sub-rule. When a particular sub-rule triggers, the next state may be activated and the sub-rule corresponding that state may be evaluated. In particular embodiments, successive states may coordinate with each other by passing state parameters from one state to the next. A state parameter may include any information that is required for evaluating the sub-rule associated with the next state. For example, if a particular sub-rule requires events 30 to be grouped, successive sub-rules may require events 30 to be filtered if they do not match the grouping criteria of the events 30 that caused the earlier sub-rule to trigger. Thus, the value of the grouping criteria may be passed as a state parameter to each successive state.

If rule engines 26 and/or state transition engines 32 do not receive any new events 30 to process for an extended amount of time, then previously received events 30 may be flushed from their respective buckets 28 to minimize the storage space used by the buckets 28. For example, events 30 in buckets 28 may become old and may unnecessarily remain in the buckets 28 until the next event is received and processed. Thus, in particular embodiments, rule engines 26 may be periodically activated even if no event 30 has been received, allowing the rule engines 26 to manage their storage space by deleting old events 30 from their respective buckets 28. In particular embodiments, the rule engines 26 may also flush their respective tracking buckets 28 and include the flushed events 30 with the previously identified incident associated with each particular tracking session.

Figure 2:
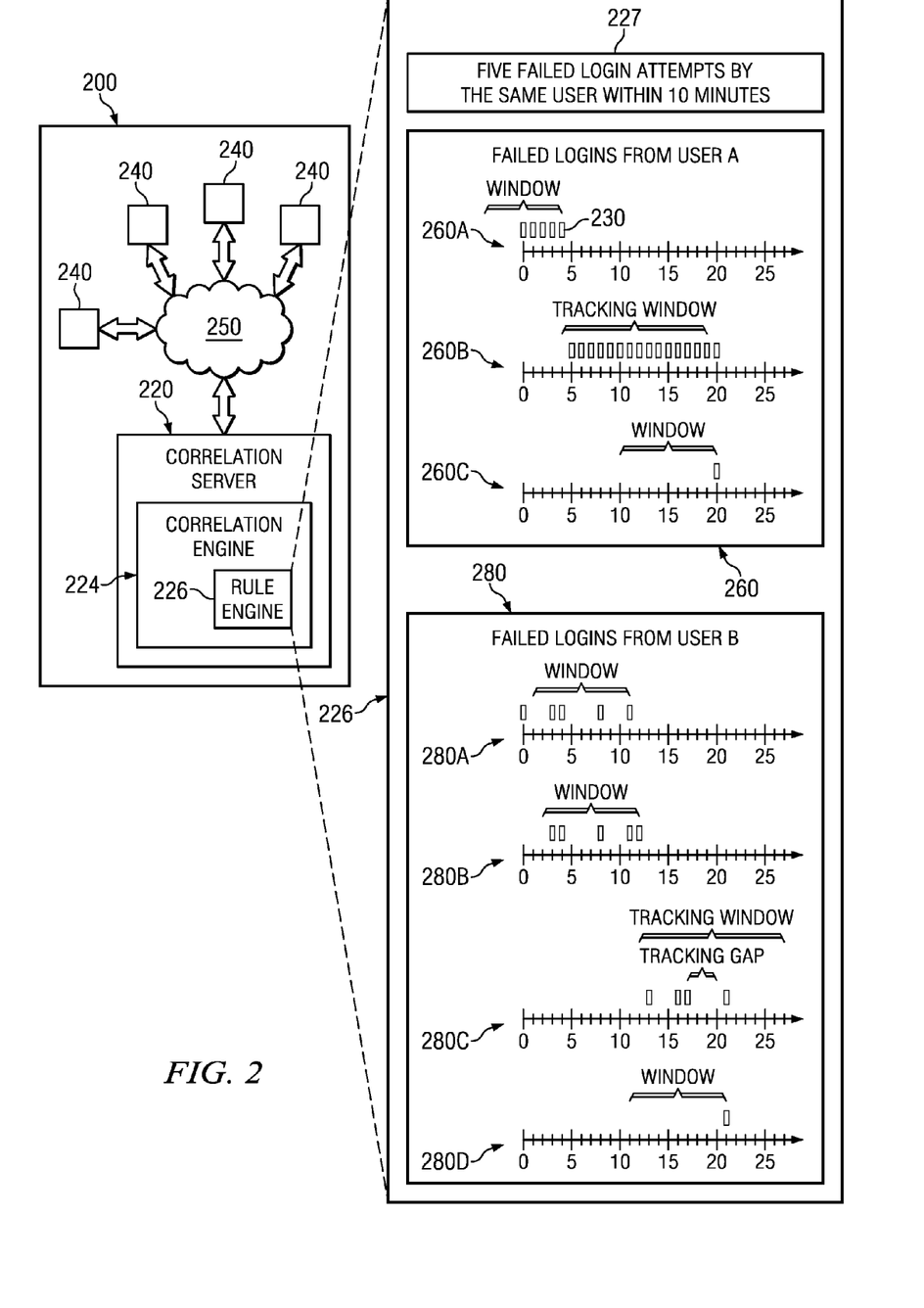
FIG. 2 illustrates examples of the operation of a rule engine in a system for time-based correlation of events, in accordance with a particular embodiment.

FIG. 2 illustrates examples of the operation of a rule engine 226 in a system 200 for time-based correlation of events 230. In the illustrated embodiment, system 200 includes correlation server 220, correlation engine 224, rule engine 226, communication resources 240, and communications network 250. In particular embodiments, correlation server 220 may receive events 230 from communication resources 240 and may use correlation engine 224 to perform time-based correlation of events 230 to identify incidents associated with events 230. Correlation server 220 may be similar to correlation server 20 of FIG. 1, correlation engine 224 may be similar to correlation engine 24 of FIG. 1, rule engine 226 may be similar to rule engine 26 of FIG. 1, communication resources 240 may be similar to communication resources 40 of FIG. 1, and communications network 250 may be similar to communications network 50 of FIG. 1.

The illustrated embodiment portrays examples of the operation of a rule engine 226 using rule 227 to process events 230 and identify incidents associated with the events 230. In the illustrated embodiment, rule 227 defines an incident as five failed login attempts by the same user within ten minutes. In addition, rule 227 also requires tracking using a tracking limit of fifteen minutes and a tracking gap of three minutes. When an event 230 is received by rule engine 226, rule engine 226 may use an event filter to determine whether the event 230 is relevant to rule 227. In the illustrated example, because rule 227 is triggered based on failed login attempts, the event filter may specify that only events 230 representing failed login attempts are relevant to rule 227. In this manner, when an event 230 is received by rule engine 226, rule engine 226 may ignore the event 230 if it does not represent a failed login attempt, and may process the event 230 if it does represent a failed login attempt. If the received event 230 does represent a failed login attempt, rule engine 226 may evaluate rule 227 using the received event 230 and any other previously received events 230 representing failed login attempts. In particular embodiments, rule engine 226 may store a received event 230 in a bucket and may evaluate rule 227 using the events 230 stored in the bucket. In the illustrated example, rule 227 is triggered based on failed login attempts from the same user, and thus rule engine 226 may evaluate rule 227 separately for events 230 from different users. Thus, when an event 230 representing a failed login attempt is received, rule engine 226 may group the event 230 with other events 230 representing failed login attempts from the same user, and rule engine 226 may evaluate rule 227 using the events 230 from that particular group. In particular embodiments, rule engine 226 may use separate buckets to store events 230 representing failed login attempts from different users. In such embodiments, when an event 230 is received, rule engine 226 may store the received event 230 in the appropriate bucket and may evaluate rule 227 using the events 230 in that bucket. In this manner, rule engine 226 may evaluate rule 227 separately for failed login attempts from different users. The illustrated embodiment portrays the processing of failed login attempts from users A and B. Accordingly, rule engine 226 may group events 230 associated with user A separately from events 230 associated with user B and may evaluate rule 227 separately for each group.

In the illustrated example, the processing of failed login attempts from user A is portrayed by diagram 260. As illustrated in diagram 260A, rule engine 226 receives events 230 corresponding to failed login attempts from user A at times 0, 1, 2, 3, and 4. When each event 230 is received, rule engine 226 may store the event 230 in a bucket and may evaluate rule 227 on the events 230 in the bucket. When evaluating rule 227, rule engine 226 may first determine the total number of events 230 in the bucket. Because five failed login attempts are required to trigger rule 227, if there are less than five events 230 in the bucket then rule engine 226 may determine that rule 227 has not been triggered. Thus, after receiving each of the first four events 230 at times 0, 1, 2, and 3, respectively, rule engine 226 may determine that rule 227 has not been triggered since there are less than five events 230 in the bucket. After receiving the fifth event 230 at time 4, rule engine 226 may determine that it has received the appropriate number of events 230 required to trigger rule 227. Rule engine 226 may then determine whether the events 230 occurred within ten minutes, as required by rule 227. In particular embodiments, rule engine 226 may identify a time window extending ten minutes prior to the most recent event 230, and rule engine 226 may determine whether each event 230 in the bucket occurred during the identified window. In the illustrated example, the most recent event 230 occurred at time 4 and thus the identified time window ends at time 4 and extends ten minutes prior (i.e., beyond the occurrence of first event at time 0). After verifying that each event 230 occurred during the identified time window, rule engine 226 may determine that rule 227 has been triggered. In particular embodiments, rule engine 226 may then generate an incident associated with the triggering events 230 and may flush the events 230 from the bucket. Flushing events 230 may result in associating events 230 with the identified incident and removing the events 230 from the bucket.

Because rule 227 requires tracking, rule engine 226 may initiate a tracking session after determining that rule 227 has been triggered. In the illustrated example, rule 227 requires tracking using a tracking limit of fifteen minutes and a tracking gap of three minutes. Processing of events 230 during the tracking session is illustrated in diagram 260B. The tracking window extends for fifteen minutes after rule 227 is triggered (i.e., time 4 through time 19). Events 230 that occur during the tracking session are included with the previously identified incident. In the illustrated example, an event 230 occurs every minute during the tracking session and thus the tracking gap of three minutes is never exceeded. Thus, the tracking session continues for the entire duration of the fifteen minute tracking window and all events 230 received during the tracking session are included with the previously identified incident and are flushed from the bucket. After the tracking session has expired, rule engine 226 processes events 230 normally by evaluating rule 226 using the received events 230. In the illustrated example, an event 230 is received at time 20, which is after the tracking session has expired. As illustrated in diagram 260C, the event 230 received at time 20 is the only event 230 in the bucket because the previous events 230 have been flushed. Thus, rule 227 is not triggered and rule engine 226 may wait until additional events 230 are received.

In the illustrated example, the processing of failed login attempts from user B is portrayed by diagram 280. As illustrated in diagram 280A, rule engine 226 receives events 230 corresponding to failed login attempts from user B at time 0, 3, 4, 8, and 11. When each event 230 is received, rule engine 226 may store the event 230 in a bucket and may evaluate rule 227 on the events 230 in the bucket. After receiving each of the first four events 230 at time 0, 3, 4, and 8, rule engine 226 may determine that rule 227 has not been triggered since there are less than five events 230 in the bucket. After receiving the fifth event 230 at time 11, rule engine 226 may determine that it has received the appropriate number of events 230 required to trigger rule 227. Rule engine 226 may then determine whether the events 230 occurred within a ten minute time window, as required by rule 227. In the illustrated example, the identified time window begins at time 1 and ends at time 11 (i.e., the time the most recent event 230 occurred). Upon verifying whether each event 230 occurred within the time window, rule engine 226 may determine that the event 230 that occurred at time 0 was not within the identified time window and rule engine 226 may delete that event 230 from the bucket. Rule engine 226 may then determine that because only four events 230 remain in the bucket, only four failed login attempts were received within the ten minute window. Accordingly, rule engine 226 may determine that rule 227 has not been triggered and rule engine 226 may wait for the next event 230 to occur. As illustrated in diagram 280B, the next event 230 occurs at time 12. After adding this event 230 to the bucket, rule engine 226 may determine that the bucket contains five events 230 and thus may verify whether the events 230 occurred within a ten minute time window. In the illustrated example, the identified time window begins at time 2 and ends at time 12. After verifying that each event 230 occurred during the identified time window, rule engine 226 may determine that rule 227 has been triggered. Rule engine 226 may then generate an incident associated with the triggering events 230 and may flush the events 230 from the bucket.

Because rule 227 requires tracking, rule engine 226 may initiate a tracking session after determining that rule 227 has been triggered. As illustrated in diagram 280C, the tracking window extends for 15 minutes after rule 227 is triggered (i.e., time 12 through time 27) and events 230 are received at time 13, 16, 17, and 21, all within the tracking window. However, rule 227 has a tracking gap of three minutes, but four minutes have lapsed between the events 230 received at time 17 and time 21. Thus, the tracking gap has been exceeded and the tracking session has already expired at time 21. The events 230 that occurred before the tracking gap was exceeded (i.e., the events occurring at time 13, 16, and 17) are included with the previously identified incident (i.e., the incident identified based on the events from diagram 280B) and are flushed from the bucket. The event 230 that occurred after the tracking gap was exceeded will not be included with the previously identified incident and instead will be evaluated normally using rule 227. As illustrated in diagram 280D, because the events 230 that occurred during the tracking session have been flushed, the event 230 that occurred after the tracking gap was exceeded is the only event 230 in the bucket. Accordingly, rule engine 226 may determine that rule 227 has not been triggered and may wait until additional events 230 are received.

Figure 3:
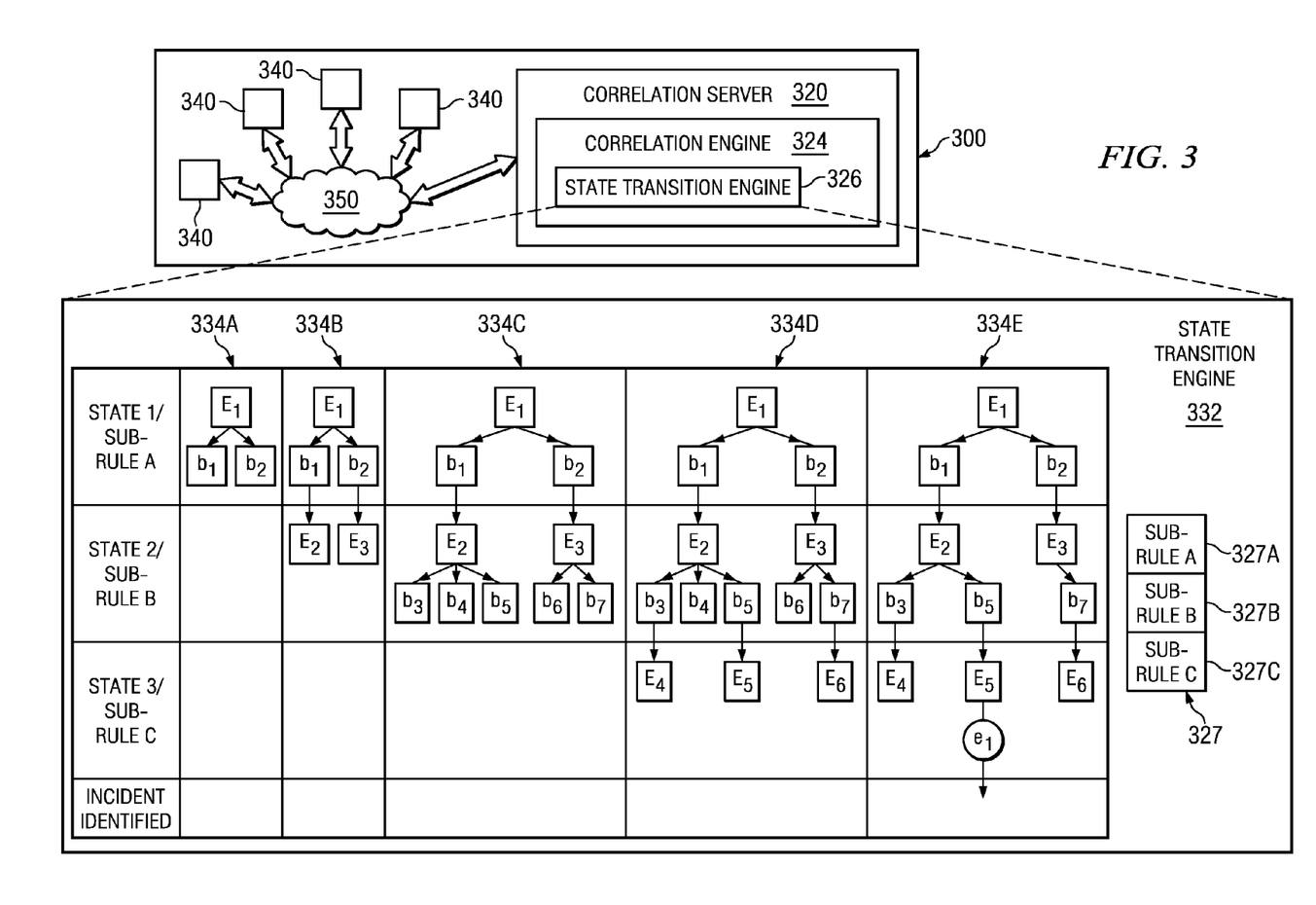
FIG. 3 illustrates examples of the operation of a state transition engine in a system for time-based correlation of events, in accordance with a particular embodiment.

FIG. 3 illustrates examples of the operation of a state transition engine 332 in a system 300 for time-based correlation of events 330. In the illustrated embodiment, system 300 includes correlation server 320, correlation engine 324, rule engine 326, state transition engine 332, communication resources 340, and communications network 350. In particular embodiments, correlation server 320 may receive events 330 from communication resources 340 and may use correlation engine 324 to perform time-based correlation of events 330 to identify incidents associated with events 330. Correlation server 320 may be similar to correlation server 20 of FIG. 1, correlation engine 324 may be similar to correlation engine 24 of FIG. 1, state transition engine 332 may be similar to state transition engine 32 of FIG. 1, communication resources 340 may be similar to communication resources 40 of FIG. 1, and communications network 350 may be similar to communications network 50 of FIG. 1.

The illustrated embodiment portrays an example of the operation of a state transition engine 332 used to evaluate a rule 327 comprised of multiple sub-rules. For example, a rule may be comprised of sub-rules A, B, and C, such that sub-rule A is evaluated first; if sub-rule A is triggered then sub-rule B is evaluated; if sub-rule B is triggered then sub-rule C is evaluated; and if sub-rule C is triggered then rule 327 is triggered and an incident is identified. In particular embodiments, sub-rules may also include time constraints requiring the sub-rules to trigger within a specified amount of time after the previous sub-rule is triggered. Because these time constraints are tied to the previous sub-rule, only sub-rules evaluated after the first sub-rule may have such time constraints. If a particular sub-rule does not trigger within the specified time constraints, the rule engine 326 may restart by evaluating the first sub-rule. If all sub-rules trigger within the specified time constraints, the state transition engine 332 may generate an incident based on all events 330 that caused the sub-rules to trigger. In particular embodiments, a sub-rule may be a simple filter, counting, or absent event sub-rule. A simple filter sub-rule may trigger every time an event 330 matching its filter is identified. A counting sub-rule may trigger upon identifying a specified number of events 330 matching its filter. In particular embodiments, the counting sub-rule may require that the specified number of events 330 occur within a specified amount of time. In particular embodiments, a counting sub-rule may also group events 330 based on a grouping criteria and may trigger upon identifying a specified number of events 330 in the same group. An absent event sub-rule may trigger based on the absence of a particular event 330 rather than the occurrence of an event 330. In particular embodiments, an absent event sub-rule may trigger if no events 330 matching its filter are identified within a specified amount of time after the previous sub-rule was triggered. Because the time constraints on an absent event sub-rule may be tied to the previous sub-rule, only sub-rules evaluated after the first sub-rule may be an absent event sub-rule.

In particular embodiments, state transition engine 332 may implement and maintain a state tree 334 that may be used to evaluate the associated rule 327 of the state transition engine 332. The state tree 334 may comprise one or more rule engines that correspond to the various sub-rules of the rule 327. For example, the state tree 334 may initially contain a single rule engine corresponding to the first sub-rule. If a particular sub-rule requires grouping, each bucket that is created to store a particular group of events 330 may be implemented in the state tree 334 as a child branch of the parent rule engine. In addition, each time a sub-rule of a rule engine triggers, the state transition engine 332 may activate a new rule engine corresponding to the next sub-rule. The new rule engine may be implemented in the state tree 334 as a child branch of the parent rule engine whose sub-rule was triggered, or if the triggered sub-rule required grouping, the new rule engine may be implemented as a child branch of the particular bucket whose events caused the sub-rule to trigger. If a particular sub-rule associated with a rule engine triggers and there are no remaining sub-rules, the state transition engine 332 may determine that an incident has been identified.

The illustrated embodiment portrays an example of the operation of a state transition engine 332 evaluating a rule 327 comprised of three sub-rules. Sub-rule A is the first sub-rule and is a counting rule. Sub-rule B is the second sub-rule and is another counting rule that must be triggered within five minutes of sub-rule A. Sub-rule C is the third sub-rule and is a simple filter rule that must be triggered within fifteen minutes of sub-rule B. The illustrated embodiment portrays various examples of the state tree 334 throughout the process of evaluating rule 327. State transition engine 332 may begin the process of evaluating rule 327 by evaluating the first sub-rule. As illustrated in diagram 334A, state transition engine 332 creates rule engine $E_1$ which is used to process events 330 by evaluating sub-rule A. Rule engine $E_1$ identifies events 330 matching the filter of sub-rule A and groups the events 330 according to the grouping criteria of sub-rule A. In the illustrated example, rule engine $E_1$ identifies events 330 from two different groups and creates child buckets $b_1$ and $b_2$ to store the events 330 from each group. Rule engine $E_1$ continues to store received events 330 in the appropriate bucket until either bucket becomes full. If a bucket becomes full, rule engine $E_1$ may determine whether all events 330 in the bucket were received within the time-constraints specified by sub-rule A. If rule engine $E_1$ determines that all events 330 were received within the specified time-constraints, rule engine $E_1$ may determine that sub-rule A has been triggered. After sub-rule A has been triggered by a group of events 330 in a particular bucket, state transition engine 332 may transition to the next state for that group of events 30 and may begin evaluating sub-rule B. As illustrated in diagram 334B, sub-rule A is triggered by events 330 from both buckets $b_1$ and $b_2$, and thus rule engines $E_2$ and $E_3$ are created to begin evaluating sub-rule B. As illustrated in diagram 334C, rule engine $E_2$ identifies events 330 from three different groups and creates buckets $b_3$, $b_4$, and $b_5$ to store the events 330 from each group. Rule engine $E_3$ identifies events 330 from two different groups and creates buckets $b_6$ and $b_7$ to store the events 330 from each group. When an event 330 is received and stored in a bucket, rule engines $E_2$ and $E_3$ may evaluate sub-rule B using the events 330 stored in the particular bucket. Because rule 327 requires sub-rule B to trigger within five minutes of sub-rule A, events 330 from the buckets of rule engines $E_2$ and $E_3$ must trigger sub-rule B within five minutes. As illustrated in diagram 334D, events 330 from buckets $b_3$, $b_5$, and $b_7$ each cause sub-rule B to trigger within five minutes and thus rule engines $E_4$, $E_5$, and $E_6$ are created to begin evaluating sub-rule C. However, events 330 from buckets $b_4$ and $b_6$ do not cause sub-rule B to trigger within the requisite time. Thus, as illustrated in diagram 334E, buckets $b_4$ and $b_6$ are removed from state tree 334E. Rule engines $E_4$ $E_5$, and $E_6$ may then determine whether sub-rule C is triggered with fifteen minutes of sub-rule B. Because sub-rule C is a simple filter rule, sub-rule C may be triggered by a single event 330 matching the filter of either rule engine $E_4$ $E_5$, or $E_6$ within fifteen minutes after sub-rule B triggered. As illustrated in diagram 334E, rule engine $E_5$ identifies an event $e_1$ matching its filter within the requisite time period and thus sub-rule C is triggered. Because all sub-rules of rule 327 have been triggered, state transition engine 332 may determine that rule 327 has been triggered and may generate an incident based on the triggering events 30. In particular embodiments, the generated incident may identify all events 330 that caused each sub-rule to trigger. In the illustrated example, the events from bucket $b_1$ caused sub-rule A to trigger, the events from bucket $b_5$ caused sub-rule B to trigger, and event $e_1$ caused sub-rule C to trigger. Thus, the generated incident may identify the events from buckets b1 and $b_5$ and event $e_1$ as events associated with the identified incident. State transition engine 332 may notify correlation engine 324 of the identified incident, and correlation engine 324 may then notify correlation server 320 to allow correlation server 320 to take the appropriate action in response to the identified incident.

Figure 4:
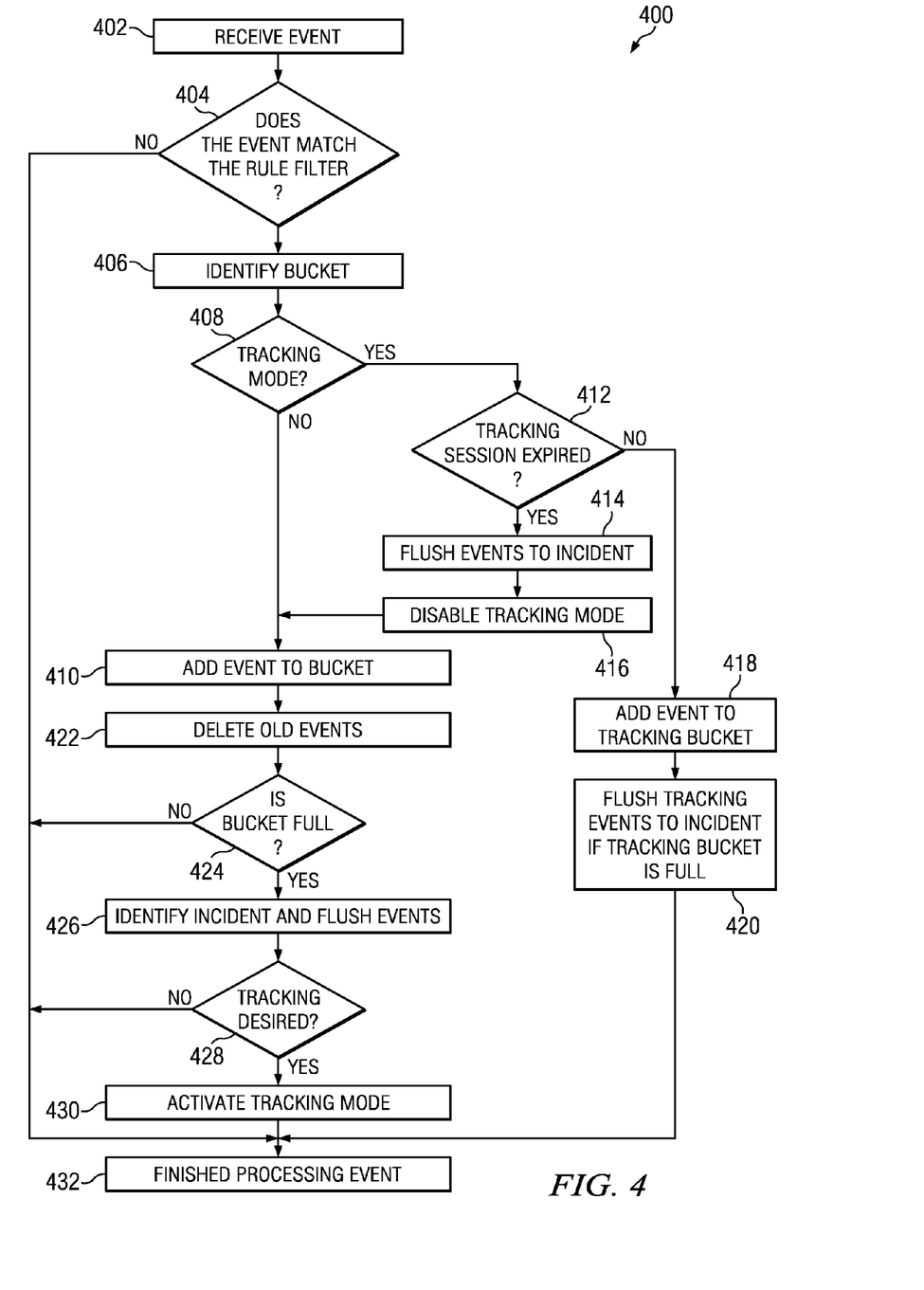
FIG. 4 is a flowchart illustrating a method of time-based correlation of events, in accordance with a particular embodiment.

FIG. 4 is a flowchart, designated generally by reference number 400, illustrating a method of time-based correlation of events in accordance with a particular embodiment. In particular embodiments, the system may include various communication resources capable of identifying, processing, and/or generating events associated with the operation of the system. An event may comprise certain information, including the type of event, the time the event occurred, information associated with the context of the event, and/or any other information associated with the event. Upon detecting an event, a communication resource may transmit the event to a correlation server to allow the correlation server to identify any incidents associated with the event. In particular embodiments, the correlation server may include a correlation engine, which may include one or more rule engines. Each rule engine may be configured to evaluate a rule to determine if the rule is triggered by the received event. A rule may specify the particular event or sequence of events associated with an incident. Upon receiving an event, the correlation engine may provide the received event to each of its rule engines to allow each rule engine to process the event by evaluating its associated rule. The illustrated method portrays the processing of an event by an individual rule engine in accordance with a particular embodiment.

The method may begin at step 402, where an event may be received from the correlation engine by a particular rule engine. At step 404, the rule engine may begin evaluating its associated rule by determining whether the event matches the filter of the rule to determine whether the event is relevant to the rule. For example, a particular rule may define an incident based on the occurrence of events that meet certain criteria, such as a particular type of event, and events that do not meet that criteria may not be relevant to that particular rule. If the event does not match the filter of the rule, the rule engine may conclude that the event is not relevant to its associated rule and may ignore the event. In particular embodiments, if the event does not match the filter of the rule, the rule engine may also determine whether the event matches the reset filter of the rule. In such embodiments, the reset filter may be used to, upon detecting events that meet certain criteria, reset the evaluation of the particular rule as if no previous events matching the filter of the rule had been received. The method may then proceed to step 432, where the rule engine may be finished processing the event. However, if the event does match the filter of the rule in step 404, at step 406 the rule engine may identify the appropriate bucket for storing the event. In particular embodiments, a rule engine may group events based on a grouping criteria and may evaluate its rule separately for different groups of events. In such embodiments, the rule engine may use separate buckets to store events from different groups. Thus, if the rule requires grouping, at step 406 the rule engine may identify the appropriate group for the event and may identify the bucket used to store events from that group. In particular embodiments, if no events from the particular group have been received by the rule engine, the rule engine may need to create a new bucket to store events for the particular group.

At step 408, the rule engine may determine whether the identified bucket is in tracking mode. In particular embodiments, after a rule is triggered by the events stored in a bucket, the rule engine may initiate a tracking session by switching the bucket into tracking mode. A tracking session may be used to identify events that occur after a rule is triggered but are nonetheless related to the incident associated with the triggered rule. If the rule engine determines at step 408 that the bucket is not in tracking mode, then the event may be processed normally at step 410. However, if the rule has already been triggered and an incident has been identified, the bucket may be in tracking mode. If it is determined at step 408 that the bucket is in tracking mode, then at step 412 the rule engine may then determine whether the tracking session has expired. In particular embodiments, a tracking session may expire based on a tracking limit and/or a tracking gap. A tracking limit may specify the maximum duration of a tracking session, and a tracking gap may specify the maximum amount of time that may lapse between events during a tracking session. If either the tracking limit or tracking gap have been exceeded, the rule engine may determine that the tracking session has expired. If the rule engine determines that the tracking session has not expired, at step 418 the rule engine may add the event to the tracking bucket. At step 420, the rule engine may then determine whether the tracking bucket is full, and if so, may flush the events from the tracking bucket and may include the flushed events with the previously identified incident. In this manner, the tracking bucket may be flushed before the tracking session expires to minimize the storage space used by the tracking bucket. The method may then proceed to step 432, where the rule engine may be finished processing the event.

If the rule engine determines at step 412 that the tracking session has expired, at step 414 the rule engine may flush all the events in the tracking bucket and may include the flushed events with the previously identified incident. At step 416, the rule engine may then disable tracking mode for the bucket. At that point, all events that occurred during the tracking session have been flushed from the bucket and have been included with the identified incident. The event that is currently being processed by the rule engine, however, occurred after the tracking session expired, and thus may be processed normally. Thus, after tracking mode is disabled for the bucket at step 416, the event may be processed normally at step 410 as if the event had been received when the bucket was not in tracking mode.

At step 410, the rule engine may add the event to the bucket. At step 422, the rule engine may then delete old events from the bucket. In particular embodiments, the rule engine may only delete old events if it first determines that the bucket is full. An event may be old if the event is outside of the time constraints specified by the particular rule. For example, a rule may trigger upon identifying five events within a specified amount of time. Any events that did not occur within the specified amount of time of the most recent event may be old. In this manner, the storage space used by the bucket is minimized by deleting old events each time the rule engine processes an event. However, if the rule engine does not receive any events to process for an extended amount of time, then the events stored in the bucket may become old and may remain in the bucket until the next event is received and processed. Thus, in particular embodiments, the rule engine may be periodically activated even though no event has been received, allowing the rule engine to minimize its storage space by deleting old events from the bucket. In such embodiments, if the bucket is in tracking mode when the rule engine is activated for this purpose, the rule engine may choose to flush events from the tracking bucket in the manner described above. At step 424, it is determined whether the bucket is full. The bucket may be full if it contains the requisite number of events required to trigger the particular rule. For example, if a rule requires five failed login attempts, the rule engine may determine that the bucket is full if the bucket contains at least five events. If it is determined that the bucket is not full, then the bucket does not contain the requisite number of events to trigger the particular rule, and the method may then proceed to step 432, where the rule engine may be finished processing the event. If it is determined that the bucket is full, then the bucket contains the requisite number of events to trigger the particular rule. In addition, because old events have already been deleted at step 422, all events currently in the bucket occurred within the time constraints specified by the rule. Thus, if it is determined that the bucket is full at step 424 then the rule has been triggered. At step 426, because the rule has been triggered, an incident may be identified and the rule engine may flush the events in the bucket and include the flushed events as part of the identified incident. At step 428, it is then determined whether a tracking session should be initiated. In particular embodiments, a rule may indicate whether tracking is desired. In such embodiments, if the rule that has been triggered indicates that tracking is desired, then it may be determined at step 428 that a tracking session should be initiated. If it is determined at step 428 that a tracking session should not be initiated, the method may then proceed to step 432, where the rule engine may be finished processing the event. If it is determined at step 428 that a tracking session should be initiated, then at step 430 the bucket may be switched into tracking mode. After the bucket is switched into tracking mode, the method may then proceed to step 432, where the rule engine may be finished processing the event.

At step 432, the particular rule engine may be finished processing the event. Any additional rule engines of the correlation engine may also process the event in the manner described above with respect to steps 402-432 until the event has been processed by all rule engines. Events may be continuously processed and correlated in this manner in order to identify incidents associated with the events.

Figure 5:
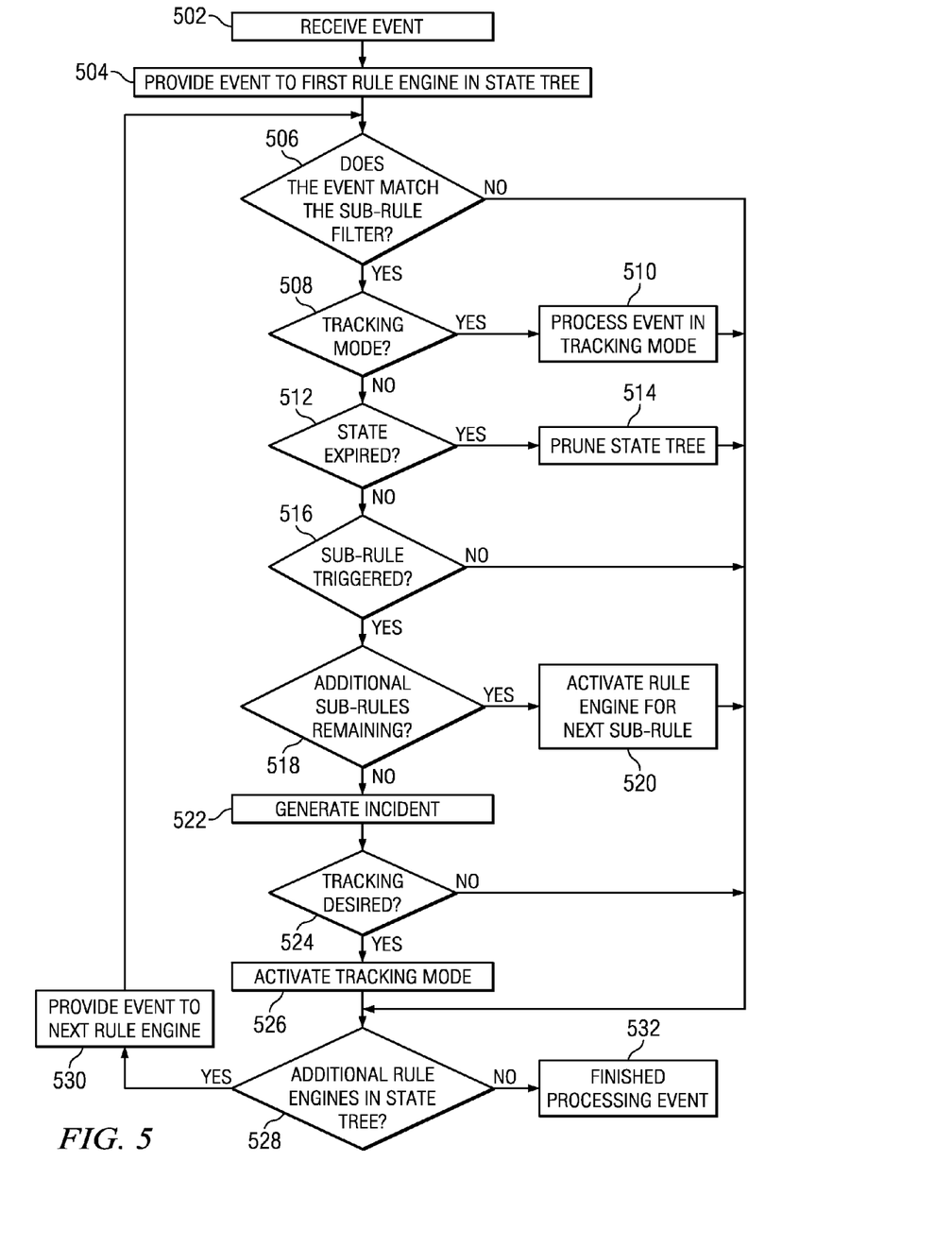
FIG. 5 is a flowchart illustrating a method of time-based correlation of events using a state transition engine, in accordance with a particular embodiment.

FIG. 5 is a flowchart, designated generally by reference number 500, illustrating a method of time-based correlation of events using a state transition engine in accordance with a particular embodiment. In particular embodiments, the system may include various communication resources capable of identifying, processing, and/or generating events associated with the operation of the system. Upon detecting an event, a communication resource may transmit the event to a correlation server to allow the correlation server to identify any incidents associated with the event. In particular embodiments, the correlation server may include a correlation engine, which may include one or more state transition engines. Each state transition engine may be configured to evaluate a rule comprised of multiple sub-rules to determine if the rule is triggered by the received event. Upon receiving an event, the correlation engine may provide the received event to each state transition engine to allow each state transition engine to process the event by evaluating its associated rule. In particular embodiments, a state transition engine may implement and maintain a state tree that may be used to evaluate the associated rule of the state transition engine. The state tree may comprise one or more rule engines that correspond to the various sub-rules of the rule. Upon receiving an event from the correlation engine, a state transition engine may process the received event by providing it to each rule engine in the state tree to allow each rule engine to evaluate its corresponding sub-rule. If a particular sub-rule associated with a rule engine triggers and there are no remaining sub-rules, the state transition engine may determine that an incident has been identified. The illustrated method portrays the processing of an event by a state transition engine in accordance with a particular embodiment.

The method may begin at step 502 where an event may be received from the correlation engine by a particular state transition engine. At step 504, the state transition engine may provide the event to the first rule engine in its state tree, which may be the rule engine corresponding to the first sub-rule. At step 506, the particular rule engine may begin evaluating its respective sub-rule by determining whether the event matches the filter of the sub-rule to determine whether the event is relevant to the sub-rule. If the event does not match the filter of the sub-rule, the state transition engine may conclude that the event is not relevant to the sub-rule and may ignore the event. The particular rule engine may then be finished processing the event, and the method may proceed to step 528, where it is determined whether there are any additional rule engines in the state tree that have not yet processed the event. However, if the event does match the filter of the rule in step 506, the rule engine may identify the appropriate bucket for storing the event. If an appropriate bucket has not yet been created, a bucket may be created and may be implemented in the state tree as a child branch of the parent rule engine. At step 508, the rule engine may determine whether the identified bucket is in tracking mode. If it is determined that the bucket is in tracking mode, then at step 510 the rule engine may process the event in tracking mode. For example, the rule engine may add the event to a tracking bucket and/or may flush the tracking bucket upon determining that the tracking bucket is full or the tracking session has expired. After processing the event in tracking mode at step 510, the particular rule engine may be finished processing the event and the method may then proceed to step 528, where it is determined if there are any additional rule engines in the state tree that have not yet processed the event.

If it is determined at step 508 that the identified bucket is not in tracking mode, at step 512 it may be determined whether the state associated with the rule engine has expired. For example, in particular embodiments sub-rules may include time constraints requiring the sub-rules to trigger within a specified amount of time after the previous sub-rule. If the specified amount of time lapses, then the state associated with the particular rule engine may be expired. If it is determined at step 512 that the state associated with the rule engine has expired, at step 514 the state transition engine may prune the state tree. Pruning the state tree may first involve removing each child bucket of the rule engine if the child bucket did not cause the sub-rule to trigger. If any child buckets of the rule engine remain, then the rule engine should not be removed from the state tree because the sub-rule associated with the rule engine was triggered before the state expired. However, if no child buckets of the rule engine remain, then the rule engine may be removed from the state tree because the sub-rule associated with the rule engine was not triggered before the state expired. After removing the rule engine from the state tree, the state transition engine may remove the corresponding parent rule engine or parent bucket if the state associated with the parent has expired and the parent has no remaining child rule engines and/or buckets in the state tree. The state transition engine may continue to remove the parent of each removed rule engine and/or bucket until identifying a parent whose state has not expired or that has remaining child rule engines and/or buckets. The state transition engine may then be finished pruning the state tree and the method may then proceed to step 528, where it is determined if there are any additional rule engines in the state tree that have not yet processed the event.

If it is determined at step 512 that the state associated with the rule engine has not expired, at step 516 the rule engine may process the event by evaluating its corresponding sub-rule to determine whether the sub-rule has been triggered. For example, in particular embodiments, the event may be added to the appropriate bucket and the sub-rule may be evaluated to determine whether it has been triggered by the events stored in the identified bucket. If it is determined that the sub-rule has not been triggered, then the particular rule engine may be finished processing the event and the method may proceed to step 528, where it may be determined if there are any additional rule engines in the state tree that have not yet processed the event.

However, if it is determined that the sub-rule has been triggered, then at step 518 the state transition engine may determine whether its rule contains any additional sub-rules. If the state transition engine determines at step 518 that its rule does contain additional sub-rules, then at step 520 the state transition engine may activate a new rule engine corresponding to the next sub-rule. The new rule engine may be implemented in the state tree as a child branch of the parent rule engine whose sub-rule was triggered, or if the triggered sub-rule required grouping, the new rule engine may be implemented as a child branch of the particular bucket of the rule engine whose events caused the sub-rule to trigger. The particular rule engine may then be finished processing the event and the method may proceed to step 528, where it may be determined whether there are any additional rule engines in the state tree that have not yet processed the event.

If the state transition engine determines at step 518 that its rule does not contain any additional sub-rules, then the state transition engine may establish that its rule has been triggered since all the corresponding sub-rules have been triggered. The method may then proceed to step 522, where the state transition engine may generate an incident comprising all events that caused the corresponding sub-rules to trigger. In particular embodiments, the state transition engine may then notify the correlation engine, correlation server, and/or communication resources of the generated incident to facilitate the appropriate response to the incident. The method may then proceed to step 524, where the state transition engine may determine whether tracking is desired. If it is determined that tracking is not desired, the method may then proceed to step 528, where it may be determined whether there are any additional rule engines in the state tree that have not yet processed the event. However, if it is determined that tracking is desired, at step 526 the state transition engine may activate tracking mode and the method may then proceed to step 528, where it may be determined whether there are any additional rule engines in the state tree that have not yet processed the event.

At step 528, the state transition engine may determine whether there are any additional rule engines in the state tree that have not yet processed the event. If it is determined that there are additional rule engines, then at step 530 the state transition engine may provide the event to the next rule engine in the state tree. The method may then proceed to step 506, where the event is processed by the next rule engine as described above with respect to steps 506-526. In particular embodiments, the state transition engine may provide the event to each rule engine in the state tree in parallel rather than sequentially. If the state transition engine determines at step 528 that there are no additional rule engines in the state tree that need to process the event, at step 532 the state transition engine may determine that it is finished processing the current event. Any additional state transition engines of the correlation engine may also process the event in the manner described above with respect to steps 502-532 until the event has been processed by all state transition engines. Events may be continuously processed and correlated in this manner in order to identify incidents associated with the events.

Methods 400 and 500 may be implemented using any of the systems of FIGS. 1 2, and 3, and/or any other suitable system operable to implement methods 400 and 500. As such, the preferred initialization point for methods 400 and 500 and the order of their steps may depend on the implementation chosen. In some embodiments, some steps of methods 400 and 500 may be optionally omitted, repeated, combined, and/or performed in another order. Additionally, in some embodiments, some steps of methods 400 and 500 may be executed in parallel with other steps of methods 400 and 500.

In certain embodiments, methods 400 and 500, and/or functionality of the systems of FIGS. 1, 2 and 3, may be implemented partially or fully in software and/or logic embodied in computer-readable media. For the purposes of this disclosure, computer-readable media may include any transitory or non-transitory instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as any combination of the foregoing.

Numerous other changes, substitutions, variations, alterations and modifications may be ascertained by those skilled in the art and it is intended that some or all such changes, substitutions, variations, alterations and modifications may fall within the spirit and scope of the appended claims. Moreover, embodiments are not intended to be limited in any way by any statement in the specification that is not otherwise reflected in the claims.

What is claimed is:

1. A method, comprising:
receiving, from an interface, event information corresponding to an event associated with the operation of a system;
identifying, at a processor, related event information corresponding to a plurality of events that occurred before the event, wherein the event is related to the plurality of events;
storing, in a memory, the event information and the related event information as a group of events;
determining, at the processor, whether the group of events occurred within a first specified amount of time, by:
identifying a time window ending at the occurrence of the event and beginning the first specified amount of time before the occurrence of the event;
determining whether each event of the group of events occurred during the identified time window;
determining, at the processor, whether an intervening reset event was detected during the identified time window;
if the intervening reset event was detected during the identified time window, deleting all events, of the plurality of events, that occurred before the intervening reset event; and
identifying, at the processor, an incident associated with the group of events in response to determining that no intervening reset event was detected during the identified time window, and that the group of events occurred within the first specified amount of time.

2. The method of claim 1, further comprising deleting, from the group of events, each event of the group of events that did not occur during the identified time window.

3. The method of claim 2, further comprising:
identifying a maximum number of events allowed to be stored in the group of events;
determining whether the group of events comprises the maximum number of events.

4. The method of claim 1, wherein identifying an incident associated with the group of events comprises evaluating a rule to identify the incident.

5. The method of claim 4, wherein evaluating a rule to identify the incident comprises evaluating a plurality of sub-rules associated with the rule.

6. The method of claim 1, further comprising:
receiving additional event information corresponding to one or more additional events associated with the operation of the system; and
determining that the one or more additional events are associated with the identified incident.

7. The method of claim 6, wherein determining that the one or more additional events are associated with the identified incident comprises determining that the one or more additional events occurred within a second specified amount of time after identifying the incident.

8. The method of claim 7, wherein determining that the one or more additional events are associated with the identified incident further comprises determining that an amount of time that lapses between each of the one or more additional events is less than a third specified amount of time.

9. The method of claim 1, wherein identifying related event information corresponding to a plurality of events that occurred before the event comprises evaluating a filter to determine that the event is related to the plurality of events.

10. A system, comprising:
an interface operable to receive event information corresponding to an event;
a processor coupled to the interface and operable to identify related event information corresponding to a plurality of events that occurred before the event, wherein the event is related to the plurality of events;
a memory coupled to the processor and operable to store the event information and the related event information as a group of events; and
wherein the processor is further operable to:
determine whether the group of events occurred within a first specified amount of time, by:
identifying a time window ending at the occurrence of the event and beginning the first specified amount of time before the occurrence of the event;
determining whether each event of the group of events occurred during the identified time window; and
determine whether an intervening reset event was detected during the identified time window;
if the intervening reset event was detected during the identified time window, deleting all events, of the plurality of events, that occurred before the intervening reset event; and
identify an incident associated with the group of events in response to determining that no intervening reset event was detected during the identified time window, and that the group of events occurred within the first specified amount of time.

11. The system of claim 10, wherein the processor is further operable to delete, from the group of events, each event of the group of events that did not occur during the identified time window.

12. The system of claim 11, wherein the processor is further operable to:
identify a maximum number of events allowed to be stored in the group of events;
determine whether the group of events comprises the maximum number of events.

13. The system of claim 10, wherein the processor operable to identify an incident associated with the group of events comprises the processor operable to evaluate a rule to identify the incident.

14. The system of claim 13, wherein the processor operable to evaluate a rule to identify the incident comprises the processor operable to evaluate a plurality of sub-rules associated with the rule.

15. The system of claim 10, wherein:
the interface is further operable to receive additional event information corresponding to one or more additional events; and
the processor is further operable to determine that the one or more additional events are associated with the identified incident.

16. The system of claim 15, wherein the processor operable to determine that the one or more additional events are associated with the identified incident comprises the processor operable to determine that the one or more additional events occurred within a second specified amount of time after identifying the incident.

17. The system of claim 16, wherein the processor operable to determine that the one or more additional events are associated with the identified incident comprises the processor operable to determine that an amount of time that lapses between each of the one or more additional events is less than a third specified amount of time.

18. The system of claim 10, wherein the processor operable to identify related event information corresponding to a plurality of events that occurred before the event comprises the processor operable to evaluate a filter to determine that the event is related to the plurality of events.

19. Logic embodied in non-transitory computer readable media, the logic, when executed by a processor, operable to:
   receive event information corresponding to an event associated with the operation of a system;
   identify related event information corresponding to a plurality of events that occurred before the event, wherein the event is related to the plurality of events;
   store the event information and the related event information as a group of events;
   determine whether the group of events occurred within a first specified amount of time, by:
      identifying a time window ending at the occurrence of the event and beginning the first specified amount of time before the occurrence of the event;
      determining whether each event of the group of events occurred during the identified time window; and
   determine whether an intervening reset event was detected during the identified time window:
   if the intervening reset event was detected during the identified time window, deleting all events, of the plurality of events, that occurred before the intervening reset event; and
   identify an incident associated with the group of events in response to determining that no intervening reset event was detected during the identified time window, and that the group of events occurred within the first specified amount of time.

20. The computer readable media of claim 19, wherein the logic is further operable to delete, from the group of events, each event of the group of events that did not occur during the identified time window.

21. The computer readable media of claim 20, wherein the logic is further operable to:
   identify a maximum number of events allowed to be stored in the group of events;
   determine whether the group of events comprises the maximum number of events.

22. The computer readable media of claim 19, wherein the logic operable to identify an incident associated with the group of events comprises logic operable to evaluate a rule to identify the incident.

23. The computer readable media of claim 22, wherein the logic operable to evaluate a rule to identify the incident comprises logic operable to evaluate a plurality of sub-rules associated with the rule.

24. The computer readable media of claim 19, wherein the logic is further operable to:
   receive additional event information corresponding to one or more additional events associated with the operation of the system; and
   determine that the one or more additional events are associated with the identified incident.

25. The computer readable media of claim 24, wherein the logic operable to determine that the one or more additional events are associated with the identified incident comprises logic operable to determine that the one or more additional events occurred within a second specified amount of time after identifying the incident.

26. The computer readable media of claim 25, wherein the logic operable to determine that the one or more additional events are associated with the identified incident comprises logic operable to determine that an amount of time that lapses between each of the one or more additional events is less than a third specified amount of time.

27. The computer readable media of claim 19, wherein the logic operable to identify related event information corresponding to a plurality of events that occurred before the event comprises logic operable to evaluate a filter to determine that the event is related to the plurality of events.

* * * * *